(12) United States Patent
Heule

(10) Patent No.: US 7,172,373 B2
(45) Date of Patent: Feb. 6, 2007

(54) DEBURRING TOOL WITH QUICK CHANGE KNIFE

(75) Inventor: Heinrich Heule, Au (CH)

(73) Assignee: Heule, ULF, Balgach (CH)

( * ) Notice: Subject to any disclaimer, the term of this patent is extended or adjusted under 35 U.S.C. 154(b) by 47 days.

(21) Appl. No.: 10/895,618

(22) Filed: Jul. 21, 2004

(65) Prior Publication Data

US 2005/0132580 A1    Jun. 23, 2005

(30) Foreign Application Priority Data

Jul. 22, 2003  (DE) ................. 103 33 194

(51) Int. Cl.
*B23B 51/10* (2006.01)
*B23D 77/02* (2006.01)

(52) U.S. Cl. ............ 408/156; 408/180; 408/187; 408/714; 82/1.2

(58) Field of Classification Search ........... 408/154, 408/156, 180, 187, 188, 714; 82/1.2
See application file for complete search history.

(56) References Cited

U.S. PATENT DOCUMENTS

| | | | | |
|---|---|---|---|---|
| 1,362,529 A | * | 12/1920 | Ehlers .................. 408/135 |
| 2,404,027 A | * | 7/1946 | Belanger ............... 408/159 |
| 2,438,558 A | * | 3/1948 | Hollander .............. 408/154 |
| 2,571,395 A | * | 10/1951 | Vawter ................. 408/82 |
| 2,739,497 A | * | 3/1956 | Fried et al. ........... 408/156 |
| 2,855,812 A | * | 10/1958 | Fried .................. 408/159 |
| 2,895,356 A | * | 7/1959 | Cogsdill ............... 408/200 |
| 2,929,278 A | * | 3/1960 | Muldoon ............... 82/1.5 |
| 2,945,426 A | * | 7/1960 | Buchan ................. 408/187 |
| 2,959,109 A | * | 11/1960 | Buchan ................. 408/187 |
| 3,008,360 A | * | 11/1961 | Winberry, Jr. .......... 408/159 |
| 3,021,733 A | * | 2/1962 | Cogsdill ............... 82/1.2 |
| 3,132,543 A | * | 5/1964 | Cogsdill ............... 408/187 |
| 3,166,958 A | * | 1/1965 | Cogsdill ............... 408/147 |
| 3,172,309 A | * | 3/1965 | Cogsdill ............... 408/156 |
| 3,306,136 A | * | 2/1967 | Gustkey ................ 408/226 |
| 3,765,790 A | * | 10/1973 | Kubicek ................ 408/226 |
| 3,827,821 A | * | 8/1974 | Swenson ................ 408/59 |
| 4,086,018 A | * | 4/1978 | Robinson et al. ........ 408/226 |
| 4,147,463 A | * | 4/1979 | Robinson ............... 408/156 |
| 4,333,727 A | * | 6/1982 | Bennett ................ 408/191 |

(Continued)

FOREIGN PATENT DOCUMENTS

DE    10333194 A1 *  2/2005

(Continued)

*Primary Examiner*—Monica Carter
*Assistant Examiner*—Michael W. Talbot
(74) *Attorney, Agent, or Firm*—Norris McLaughlin & Marcus, PA

(57) ABSTRACT

The invention relates to a deburring tool with a quick change knife, which is formed by at least two parts, namely a guide sleeve having a larger diameter and a center bore, and a base body that can be inserted in the center bore in an axial direction. The base body can be secured in the center bore. A knife groove is arranged on the base body that can receive the knife to be secured, forming a pivot support in the base body. Due to this special support, the knife can be easily exchanged even when the deburring diameters are small, for example, less than 4 mm, while still being able to absorb large deburring forces.

16 Claims, 3 Drawing Sheets

U.S. PATENT DOCUMENTS

| | | | |
|---|---|---|---|
| 4,475,852 A * | 10/1984 | Koppelmann | 408/73 |
| 4,729,699 A * | 3/1988 | Frazzoli | 408/152 |
| 4,995,768 A * | 2/1991 | Craft | 408/239 A |
| 5,209,617 A * | 5/1993 | Heule | 408/178 |
| 5,277,528 A | 1/1994 | Robinson | |
| 5,358,363 A * | 10/1994 | Robinson | 408/153 |
| 5,501,554 A * | 3/1996 | Robinson et al. | 408/153 |
| 5,704,743 A * | 1/1998 | Goorsenberg | 408/159 |
| 5,897,273 A * | 4/1999 | Barbosa Leite | 408/1 R |
| 6,533,505 B1 * | 3/2003 | Robinson | 408/1 R |

FOREIGN PATENT DOCUMENTS

| | | |
|---|---|---|
| EP | 1075888 A1 * | 2/2001 |
| WO | WO/03035311 A1 | 5/2003 |

* cited by examiner

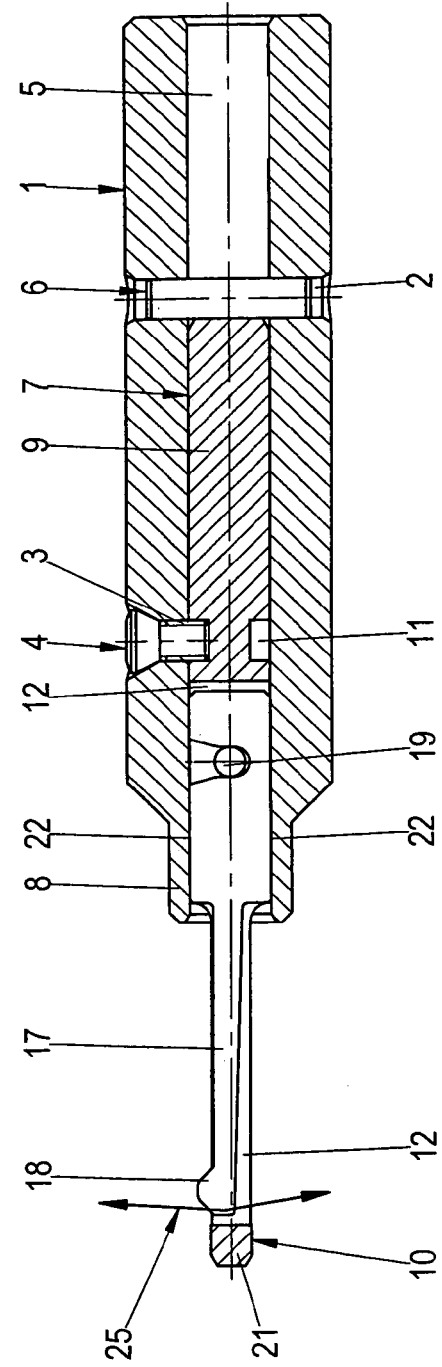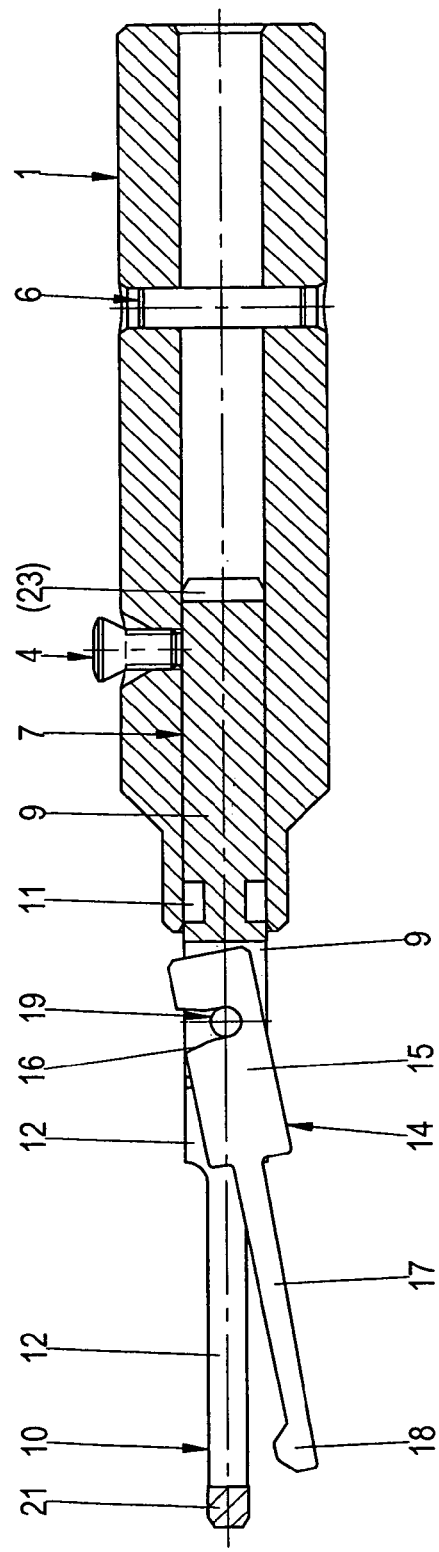
Fig. 1
Fig. 2

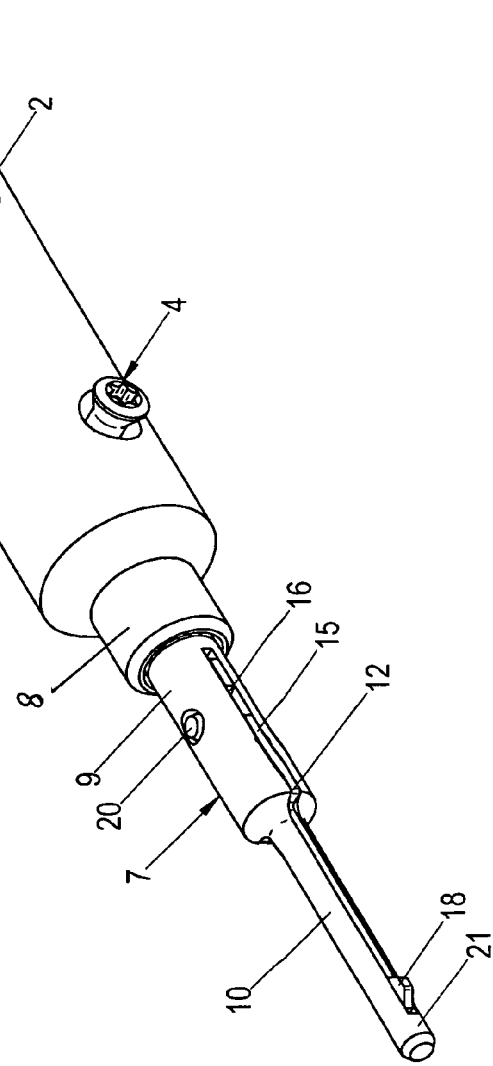
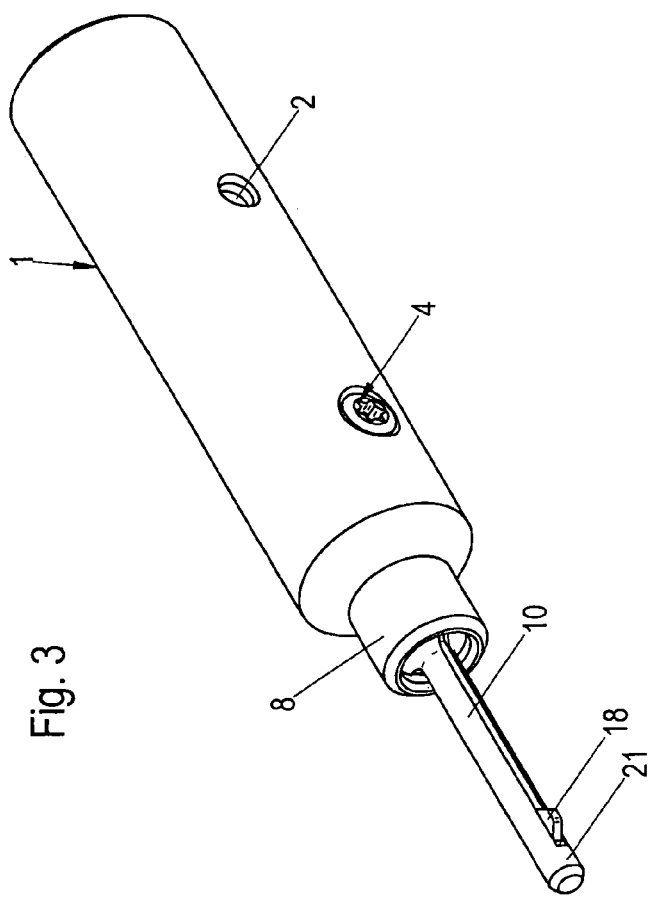

DEBURRING TOOL WITH QUICK CHANGE KNIFE

BACKGROUND OF THE INVENTION

The invention is directed to a deburring tool with a quick change knife, made of at least two releasably connectable parts.

The company Cogsdill supplies conventional tools that have an approximately cylindrical guide sleeve with a transverse slit extending over the entire length of the guide sleeve, with a fastening screw extending through the transverse slit at a predetermined location.

The deburring knife to be inserted into the transverse slit has a forward cutter portion, followed by a neck with a reduced diameter, which transitions into a guide member with a greater diameter.

This conventional knife is held in the guide sleeve by an approximately keyhole-shaped opening disposed in the guide member with the greater diameter, and a rotatable, key-shaped pin that can be inserted in the opening.

In the open position, the knife is therefore inserted with the wider guide member into the longitudinal slit in the guide sleeve, wherein the fastening pin is rotated so that it can extend through the slit in the guide member of the knife which is open on one end. When the fastening pin is rotated, its greater cross-section engages with the keyhole-shaped opening in the knife, thereby holding the knife firmly in the knife holder.

However, the knife can still cant in the knife holder, and in order to prevent canting, a projection, which cooperates with a corresponding adjustment screw, is formed on the rear free end of the conventional knife, which prevents canting of the knife in the guide sleeve.

A deburring tool of this type with a quick change knife has proven useful, although the manufacture of the knife is relatively complex. The knife must also have a well-defined keyhole-shaped opening in the larger diameter guide portion, which is also difficult to produce.

Such type of knife holder has proven to be impossible to manufacture, in particular for small deburring tools, which are used, for example, to debur hole with diameters smaller than 4 mm. Accordingly, for this application the conventional knife must be rigidly attached directly in the guide sleeve, for example by soldering or gluing. The knife could then no longer be exchanged.

It is therefore an object of the invention to modify a deburring tool with a quick change knife, so that the knife can be exchanged easily and reliably even with small deburring diameters.

BRIEF SUMMARY OF THE INVENTION

The present invention related to a deburring tool with quick change knife, made of at least two releasably connectable parts, wherein the deburring tool has a guide sleeve with at least one receiving opening, into which a base body with a knife groove and a knife is disposed, can be inserted, and wherein the guide sleeve, the base body and the knife can be directly or indirectly connected with each other for repeated release in such a way that in the operating position of the knife at least one cutting portion of the knife protrudes from the guide sleeve.

More particularly, the deburring tool of the invention has at least two parts, made of a larger diameter guide sleeve with a center bore, wherein a base body can be inserted in the center bore in an axial direction, and wherein the base body can be secured in the center bore. In addition, a knife groove is arranged on the base body which receives the knife to be secured and forms a pivoting support in the base body.

According to the aforedescribed technical teachings, a pivoting support that holds the knife is advantageously disposed between the knife and the base body, which facilitates an exchange of the knife. The knife can only be exchanged when the base body is pulled out of the center bore of the guide sleeve. However, as soon as the base body is inserted into the center bore of the guide sleeve, the knife that is inserted in the base body automatically centers of the corresponding stop faces of the center bore, so that it is securely attached to prevent displacement and rotation.

According to the technical teachings, advantageously very small deburring tools suitable to debur holes with diameters of less than 4 mm can now also be easily exchanged, because such deburring tools can be easily manufactured in miniaturized form. The knifes can be easily held in the base body and the guide sleeve using the aforedescribed pivoting attachment. The knife is thereby particularly securely attached and is able to transfer large loads, because the pivoting support of the knife on the base body that is initially provided for assembling the knife becomes ineffective, when the base body is inserted and secured in the guide sleeve. The knife is then firmly secured in the center bore of the guide sleeve and can no longer be easily pulled out.

Although the guide sleeve can be made of any suitable material, a preferred material is high-tensile steel. However, other materials, such as plastic, aluminum or a composite material can also be used. It is only significant to provide an accurately sized center bore in the guide sleeve in which the base body, which will be described below in more detail, can be inserted with as little play as possible.

Preferably, the center bore is formed so as to extend throughout the guide sleeve, i.e., the center bore, penetrates the entire guide sleeve.

In another embodiment of the invention, the center bore can also be formed as a blind hole which does not extend through the rear end face of the guide sleeve.

Nevertheless, a center bore is arranged in the guide sleeve, with the base body that can be inserted into the center bore also formed as a cylinder, so that the two round elements formfittingly engage in the radial direction with as little play as possible.

However, the invention is not limited to this embodiment, and an elliptical bore or a bore with a different profile can be provided instead of the round center bore. In this case, the portion of the guide member to be inserted into the bore can be adapted to the profile of the bore in the guide sleeve, so that both parts can again be pushed into each other with the proper orientation, with a form fit in the radial direction, and with as little play as possible.

Providing the two parts with a particular profile has the advantage that the two parts can only be inserted into each other with a particular rotation position.

The center bore also need not be arranged in the center of the guide sleeve, but can be offset from the center relative to the longitudinal axis of the guide sleeve. This eccentric arrangement of the receiving bore has the advantage that different base bodies can be interchangeably inserted into the receiving bore, i.e., different base bodies with different knifes can be interchangeably inserted into the guide sleeve.

BRIEF DESCRIPTION OF THE SEVERAL VIEWS OF THE DRAWINGS

The invention will be described hereinafter in more detail with reference to the drawings that depict several different embodiments. Additional features, applications and advantages of the invention are illustrated in the drawings and in the description of the drawings.

It is shown in:

FIG. 1 a cross-section of a first embodiment of the deburring tool in an assembled state;

FIG. 2 a cross-section through the embodiment of FIG. 1 with the knife holder and the knife pulled out;

FIG. 3 a perspective view of the deburring tool of FIG. 1;

FIG. 4 a perspective view of the deburring tool of FIG. 2; and

DETAILED DESCRIPTION OF THE INVENTION

Figure 5:
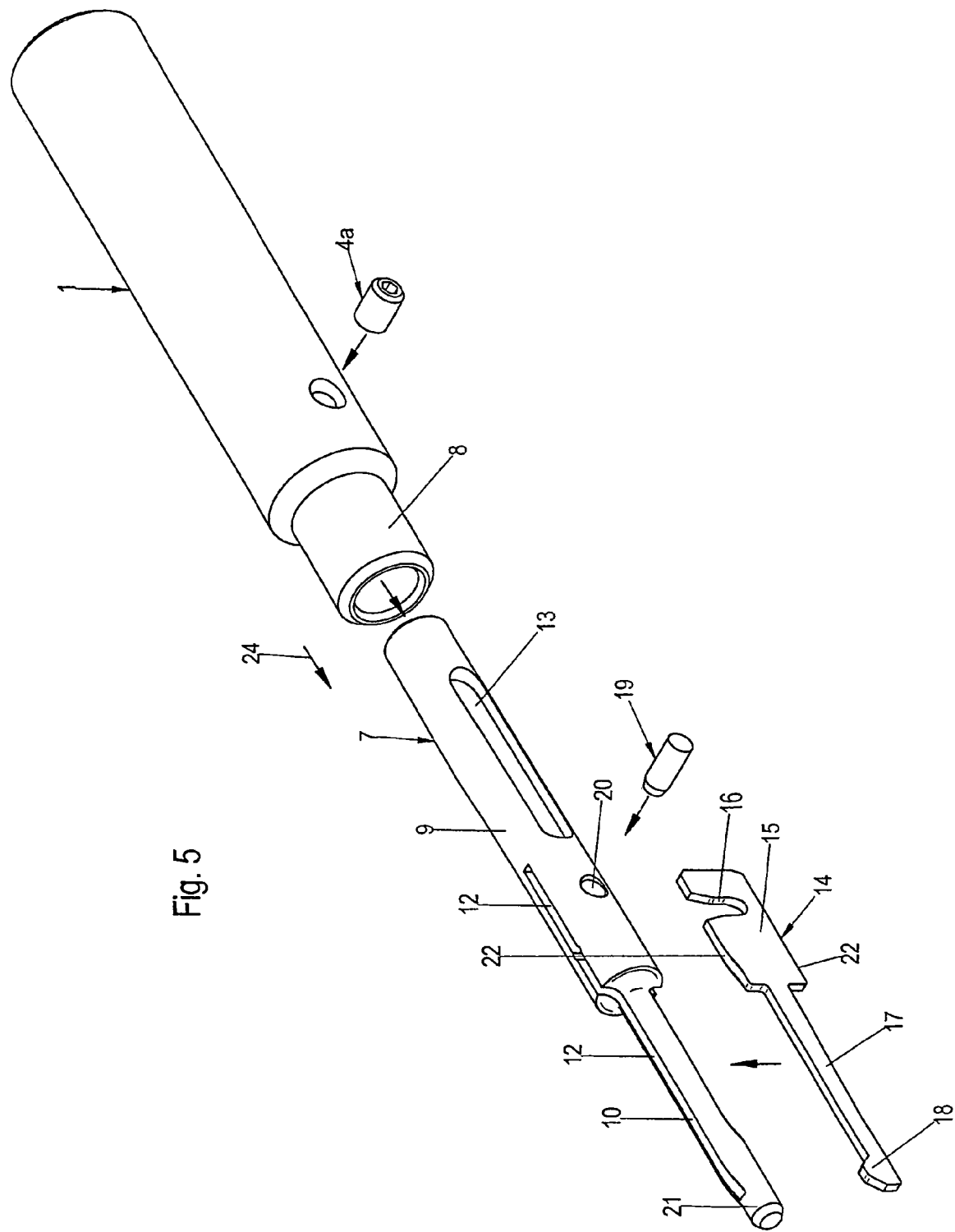
FIG. 5 a second embodiment which is modified compared to the first embodiment of FIGS. 1–4.

In the first embodiment according to FIGS. 1 to 4, a cylindrical guide sleeve 1 is provided which has a center through bore 5. The center bore 5 is located at the rear end and penetrated by a cross hole 2, in which a pin 6 is inserted. In addition, the front region includes a threaded cross bore 3, in which a flat head screw 4 is inserted.

The front end of the guide sleeve 1 is formed by an inclined, stepped shoulder 8 which is formed in one piece and of the same material as the guide sleeve 1. The stepped shoulder has a cross-section with a smaller diameter.

A base body 7 that can be displaced and secured in the axial direction is positioned in the center bore 5. The base body 7 is essentially made of a guide member 9 with a greater diameter, with an axial knife groove 12 extending lengthwise through the guide member 9. A knife holder 10, formed as one piece with the guide member 9 and made of the same material as the guide member 9, is located following the guide member 9, whereby the knife groove 12 also extends through the knife holder 10. In other words, the knife groove 12 extends through the guide member 9 and the knife holder 10 and terminates before a holder tip 21 which stabilizes the entire knife holder 10 and prevents the knife groove 12 from being spread apart by the forces exerted on the knife holder 10.

It is important that a knife 14 is pivotally supported in the knife groove 12, with a pivoting bearing formed by an associated transverse pin 19.

The transverse pin 19 extends through a corresponding bore 20 in the guide member 9, where it is anchored. The transverse pin 19 also extends through an approximately V-shaped groove 16 in the knife 14, with the groove width expanding toward the outside.

The knife 14 consists essentially of a wider guide portion 15, followed by a knife neck 17 which is made in one piece and of the same material as the guide portion 15, with the cutter portion 18 with the cutting edges arranged on the front free end of the knife neck 17.

The knife neck 17 is springy, so that the spring action of the knife neck 17 causes the cutter portion 18 to contact a bore (not shown in detail), with the cutter portion 18 deburring the edge of the bore by a rotary motion.

The knife 14 can be exchanged by at least partially pulling the base body 7 out of the guide sleeve 1, as shown in FIGS. 2 and 4. Before the knife 14 can be removed, the flat head screw 4 is loosened, which then no longer engages in the circumferential annular groove 11 disposed in the guide member 9 of the base body 7. The entire base body 7 can then be pulled out at least partially towards the front, as shown in FIGS. 2 and 4.

The guide member 9 can be held in the center bore 5 of the guide sleeve 1 by inserting the base body 7 partially in the center bore 5, as shown in FIG. 1, so that the front portion of the knife holder 10 with the smaller diameter protrudes axially from the center bore 5, resulting in the installation position depicted in FIGS. 1 and 3.

It is important that the width of the guide portion 15 of the knife 14 corresponds exactly to the interior width of the center bore 5, so that the stop faces 22 formed on the guide portion 15 of the knife 14 formfittingly contact the inside wall of the center bore 5 in the guide sleeve 1. This simple holding mechanism fully prevents canting and displacement of the knife 14.

This represents an essential advantage over the state of the art, since conventional knifes required an additional stop and a fastening screw to eliminate canting of the knife.

With the solution according to the invention, it is sufficient to insert the knife 14 in the center bore 5 of the guide sleeve, wherein the knife 14 is pivotally supported in the knife holder 10. The pivoting support is deactivated in the installation position depicted in FIGS. 1 in 3, and is only effective when the knife is to be exchanged, as depicted in FIGS. 2 and 4.

The diagram in FIGS. 2 and 4 shows that the knife 14 can be easily exchanged because the knife 14 can easily drop out when the base body 7 is pulled out of the guide sleeve 1, assisted by the conically widening groove 16.

The dimensions of the unobstructed width at the bottom of the groove 16 are selected so that the transverse pin 19 has a form fit without play. The knife 14 can then no longer move in the axial direction in the region of the groove 16.

When the base body 7 is installed in the guide sleeve 1, the threaded portion of the flat head screw 4 engages formfittingly in the circumferential annular groove 11, thereby securely fastening the base body 7 in the guide sleeve 1.

Because the annular groove 11 extends circumferentially, it is not necessary to maintain an accurate rotation position between the base body 7 and the guide sleeve 1.

However, the rotation position between the base body 7 and the guide sleeve 1 should be well defined for certain applications. To accomplish this, as indicated in FIG. 2, the rear end of the guide member 9 in the base body 7 can have a transverse groove 23, with the transverse groove at least partially enveloping the pin 6, thereby uniquely defining the rotation position (rotation lock).

In addition, the engagement between the pin 6 and the transverse groove 23 can also accurately define the insertion depth. When the base body 7 protrudes from the guide sleeve 1, the user can readily recognize when the transverse groove 23 does not envelop the pin 6, which would indicate a wrong position lock. The flat head screw 4 can then also not be screwed into the annular groove 11.

FIG. 5 shows another embodiment of a rotation lock between the base body 7 and the guide sleeve 1. In this embodiment, a longitudinal groove 13 extends along the guide member 9, in which a headless screw or a pan head screw 4a can engage. By inserting the headless screw or a pan head screw 4a in the longitudinal groove 13, the base body 7 is securely locked in the guide sleeve 1 against rotation and displacement in the axial direction. As soon as the headless screw 4a is loosened, its threaded side disengages from the longitudinal groove 13, and the base body 7 can now be pulled out of the guide sleeve 1 in the direction of arrow 24.

In the operating position, the cutter portion 18 can be springily pivoted in the directions of arrow 25 (FIG. 1) against the spring force of the knife neck 17. The cutting edges on the cutter portion 18 then contact the edge of the hole that is to be deburred and debur the hole with a rotary motion.

In other words, the cutter portion 18 can be springily pivoted in the directions of the arrow 25 (FIG. 1).

The aforementioned pivoting support of the knife 14 with a simple groove 16 and a transverse pin 19 results in a particularly simple construction of the knife 14. No additional projections, shoulders or supports and the like are required to prevent the knife 14 from canting. Canting is prevented by pulling the base body 7 into the center bore 5 of the guide sleeve 1.

Since the knife groove 12 is formed continuously, the knife 14 can advantageously be inserted into the knife groove 12 for support either from below, or—in an orientation rotated by 180°—from above, where it is then securely held.

The invention claimed is:

1. A deburring tool with quick change knife, made of at least two releasably connectable parts, comprising
    a guide sleeve with at least one receiving opening having an interior surface with an inside diameter;
    a base body having a knife groove with a guide section, said base body having a guide member configured for insertion into the at least one receiving opening in the guide sleeve;
    a knife having a guide portion, a tip, and at least one cutting portion, said guide portion having lateral stop faces spaced by a width corresponding to the interior diameter of the at least one receiving opening; and
    a pin extending in or on the guide section of the base body and through the guide portion of the knife in a direction transverse to a longitudinal axis of the knife and securing the guide portion of the knife to prevent movement between the knife and the base body in an axial direction,
    wherein in an exchange position of the knife, the guide portion of the knife is located outside the receiving opening of the guide sleeve, allowing the knife to freely pivot about the pin relative to the base body, and
    wherein in an operating position of the deburring tool, the guide portion of the knife is located inside the at least one receiving opening of the guide sleeve, with the lateral stop faces of the guide portion formfittingly contacting the inside surface of the at least one receiving opening in a radial direction without play, and the at least one cutting portion of the knife protrudes from the guide sleeve.

2. The deburring tool according to claim 1, wherein the base body and the knife are secured in the at least one receiving opening of the guide sleeve by formfittingly contacting stop faces disposed in the at least one receiving opening of the guide sleeve in a radial direction without play and by contacting stop faces disposed between the guide sleeve and the base body with the knife in an axial direction without play.

3. The deburring tool according to claim 1, wherein the base body is capable of being secured on the guide sleeve.

4. The deburring tool according to claim 1, wherein the guide portion of the knife includes an opening or a slot that is open to one side, and the guide section of the base body includes a bore, wherein the pin extends through the bore and the opening or slot and makes contact with the bore and the opening or slot without play.

5. The deburring tool according to claim 1, wherein the at least one receiving opening extends in an axial direction parallel to a longitudinal axis of the guide sleeve.

6. The deburring tool according to claim 1, wherein the at least one receiving opening of the guide sleeve extends completely through the guide sleeve.

7. The deburring tool according to claim 1, wherein a single receiving opening is provided which extends centrally with respect to a longitudinal axis of the guide sleeve.

8. The deburring tool according to claim 1, wherein the knife groove extends along a longitudinal axis of the base body and the knife is received in the knife groove with a lateral/radial play transversely to the longitudinal axis of the base body.

9. The deburring tool according to claim 1, wherein the knife groove extends completely through the base body in a radial direction, with the exception of respective end sections of the base body in the axial direction, which include the closed guide member and a closed holder tip disposed on free front end of the base body, with the closed holder tip having a predetermined distance to the tip of the knife.

10. The deburring tool according to claim 1, wherein the tip and the cutting portion of the knife can perform an elastic spring motion essentially in a direction transverse to a longitudinal axis of the at least one receiving opening about a clamping region of the guide section in the at least one receiving opening or on the base body.

11. The deburring tool according to claim 1, wherein the guide section in the base body includes a groove and the guide sleeve includes a transverse bore, and wherein the guide section is secured in the guide sleeve by a guide pin extending through the transverse bore and engaging with the groove.

12. The deburring tool according to claim 11, wherein the groove extends in a circumferential or an axial direction on the base body.

13. The deburring tool according to claim 1, wherein a cross hole, in which a positioning pin is inserted, extends through the at least one receiving bore, and that a rear end face of the guide member of the base body includes a transverse groove which in cooperation with the positioning pin provides insertion and rotation-position identification for the base body in relation to the guide sleeve.

14. The deburring tool according to claim 1, wherein in the operating position of the deburring tool, the pin is completely located inside the at least one receiving opening.

15. A deburring tool made of at least three releasably connectable parts, comprising:
    a guide sleeve with at least one opening having an inside diameter;
    at least one base body; and
    at least one knife having a width along a first knife portion corresponding to the inside diameter of the at least one opening,
    a first fastening element formfittingly securing the knife in an axial knife groove disposed in the base body without play against axial movement between the knife and the base body, and
    at least one second fastening element formfittingly and/or non-positively securing the base body in the at least one opening disposed in the guide sleeve without play against axial and radial/transverse movement and against rotation, wherein in a knife exchange position, the first knife portion is located outside the at least one opening of the guide sleeve, allowing the first knife portion to freely pivot about the first fastening element in a radial/transverse direction, and wherein in an operating position of the deburring tool, the first knife portion is located inside the at least one opening of the guide sleeve, with radial stop faces disposed on the first knife portion securing the base body with the knife formfittingly and without play inside the at least one opening in the guide sleeve against radial/transverse displacement and canting, and a second springy knife portion with a cutter portion located inside the axial knife groove protrudes in a direction away from the guide sleeve.

16. The deburring tool according to claim 15, wherein in the operating position of the deburring tool, the first fastening element is completely located inside to at least one receiving opening.

* * * * *